Oct. 22, 1957  D. B. COLEMAN  2,810,449
SOUND ABATEMENT DEVICE FOR JET ENGINES
Filed April 12, 1955  5 Sheets-Sheet 1
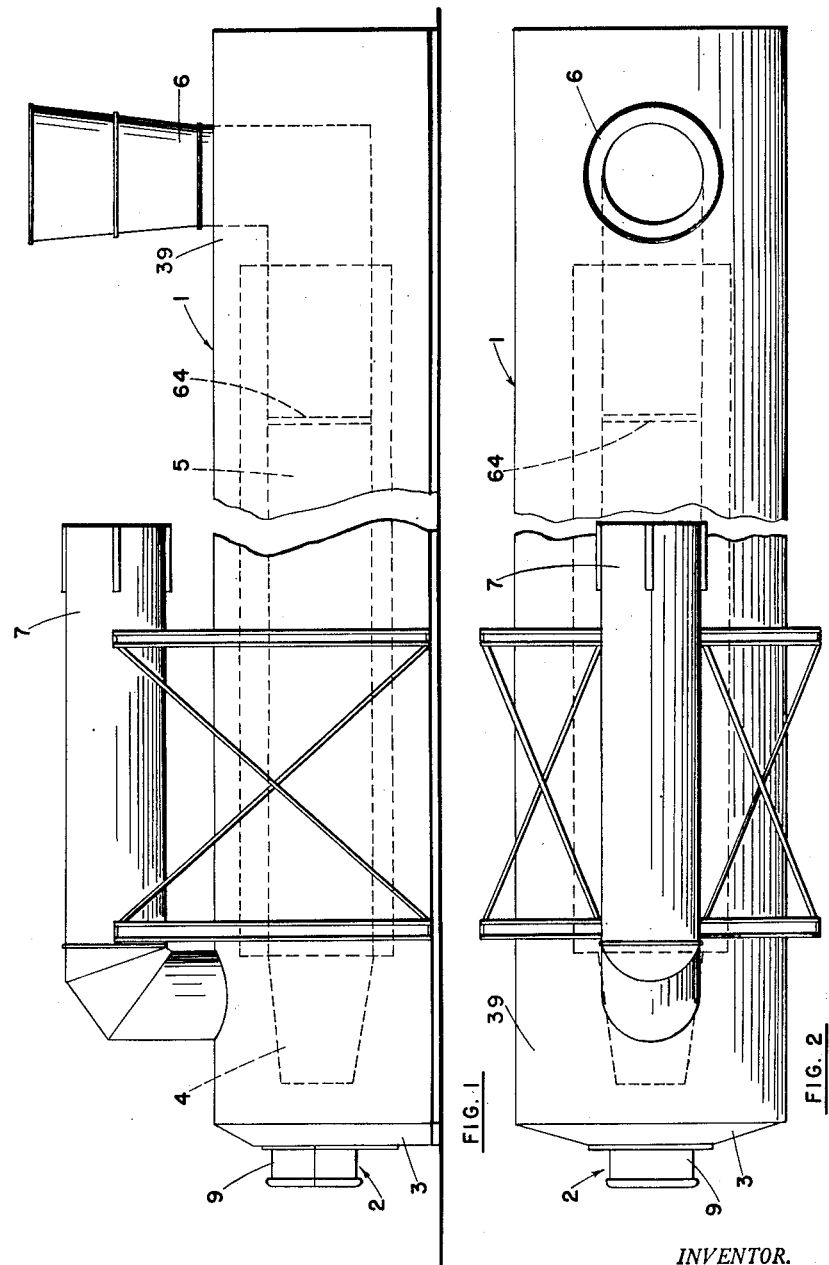
INVENTOR.
DANIEL B. COLEMAN
BY
William R. Lane
ATTORNEY

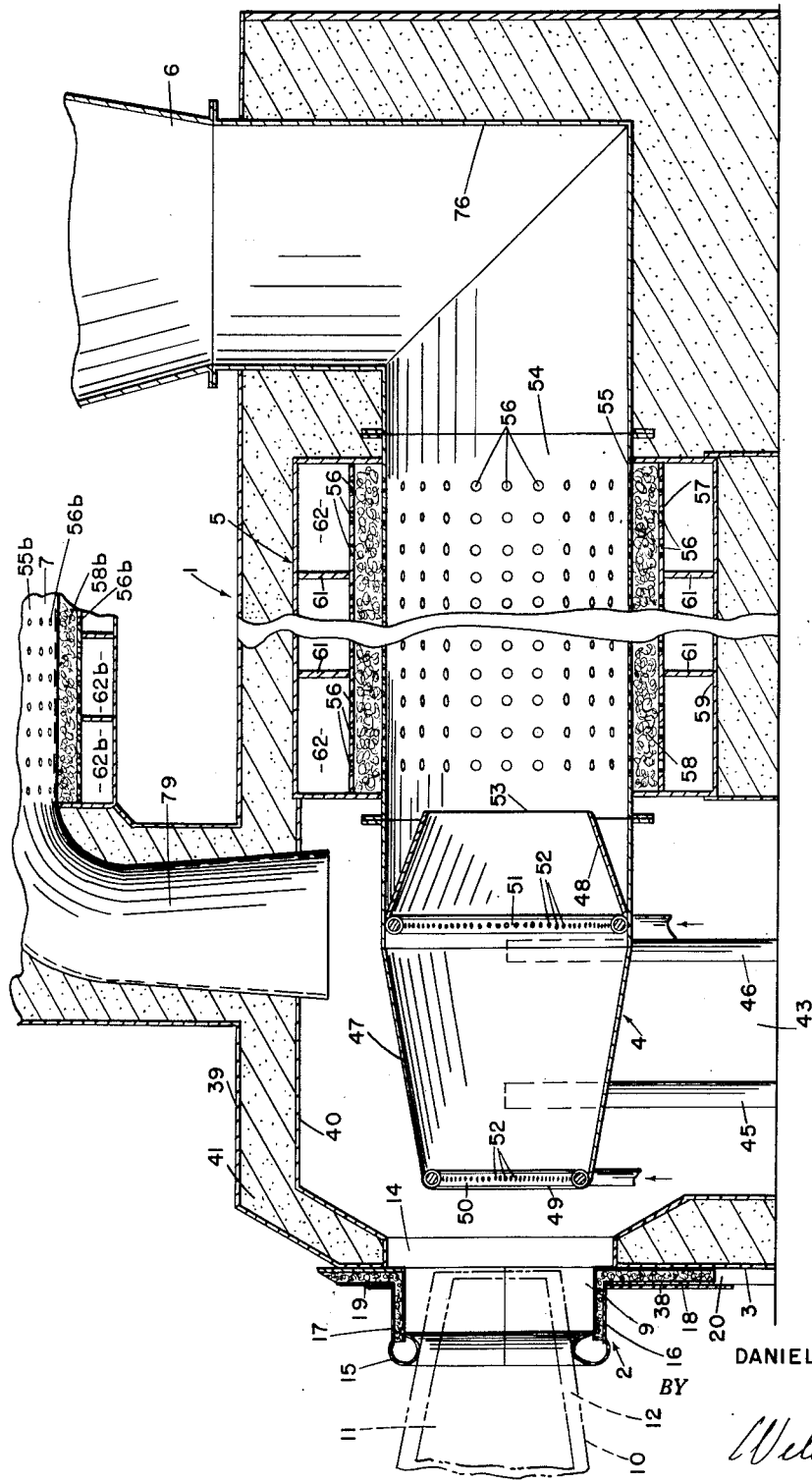

Oct. 22, 1957     D. B. COLEMAN     2,810,449
SOUND ABATEMENT DEVICE FOR JET ENGINES
Filed April 12, 1955     5 Sheets-Sheet 4

INVENTOR.
DANIEL B. COLEMAN
BY
William R. Lane
ATTORNEY

Oct. 22, 1957 D. B. COLEMAN 2,810,449
SOUND ABATEMENT DEVICE FOR JET ENGINES
Filed April 12, 1955 5 Sheets-Sheet 5

INVENTOR.
DANIEL B. COLEMAN
BY
ATTORNEY

2,810,449

SOUND ABATEMENT DEVICE FOR JET ENGINES

Daniel B. Coleman, Los Angeles, Calif., assignor to North American Aviation, Inc.

Application April 12, 1955, Serial No. 500,967

9 Claims. (Cl. 181—43)

This invention pertains to a device for attenuating sound produced by an engine and more particularly to abating noise produced by ground run-up of a jet engine.

In order to properly check a jet engine it is necessary to run the engine on the ground for various power conditions including full power operation, and, if the engine is so equipped, with the afterburner ignited. In a usual case this procedure is followed after the aircraft is assembled prior to its first flight, but with the engine fully installed in the fuselage or nacelle. Although it is necessary to so check the aircraft engines the noise level becomes almost intolerable not only for the workers in the area but for residents for some distance around. In order to alleviate such conditions various sound abatement devices have been proposed in the past, many of which are effective to a degree in reducing sound intensity, but none of which is satisfactory for the requirements of a modern high-powered engine.

Accordingly, it is an object of this invention to reduce noise produced by an engine. An additional object of this invention is to provide a sound abatement device small in size and economical to build and operate. A further object of this invention is to provide a sound abatement device which is movable to any desired location. Yet another object of this invention is to provide a sound abatement device which greatly increases the efficiency of known sound attenuating arrangements. These and other objects will become apparent from the following detailed description taken in connection with the accompanying drawings in which:

Figs. 1, 2 and 3 are side elevational, top plan and end elevational views, respectively, of the sound attenuating device of this invention;

Fig. 7 is a sectional view of the sound attenuating device including the two end portions thereof;

Figure 3:
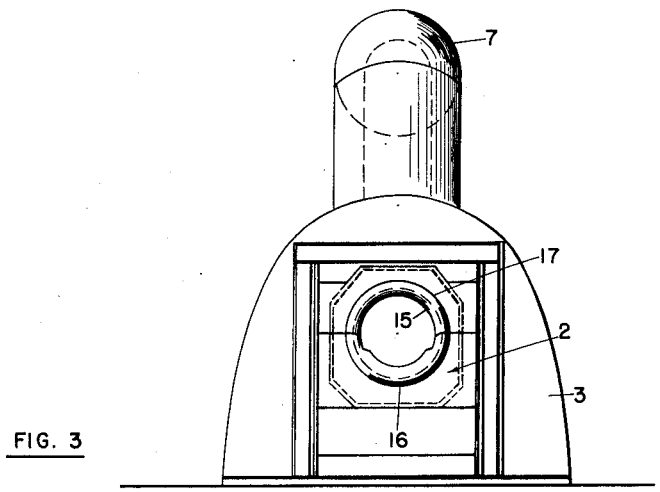

The general layout of the sound abatement device of this invention may be seen by reference to Figs. 1, 2 and 3. The device includes an elongated housing 1 which may be in the form of a building. An adapter 2 is provided at end wall 3 of the housing to receive an engine exhaust nozzle directing the exhaust into housing 1. The exhaust in the housing passes through an aspirator 4, into a muffler section 5 and is discharged from the housing through vertically directed stack 6. Air is drawn into the housing during engine operation through an intake 7.

Figure 5:
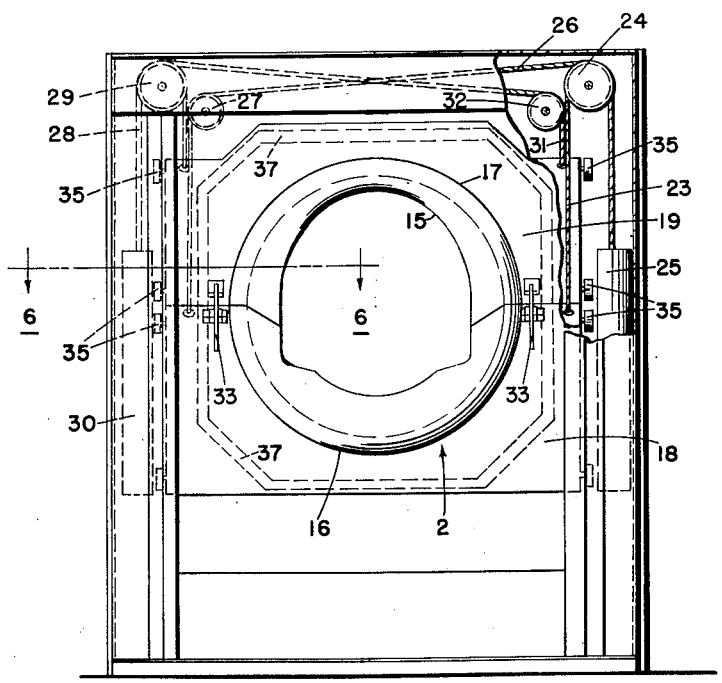
Fig. 5 is an enlarged elevational view, partially broken away, of the end wall and adapter.
Figures 4, 6, 8:
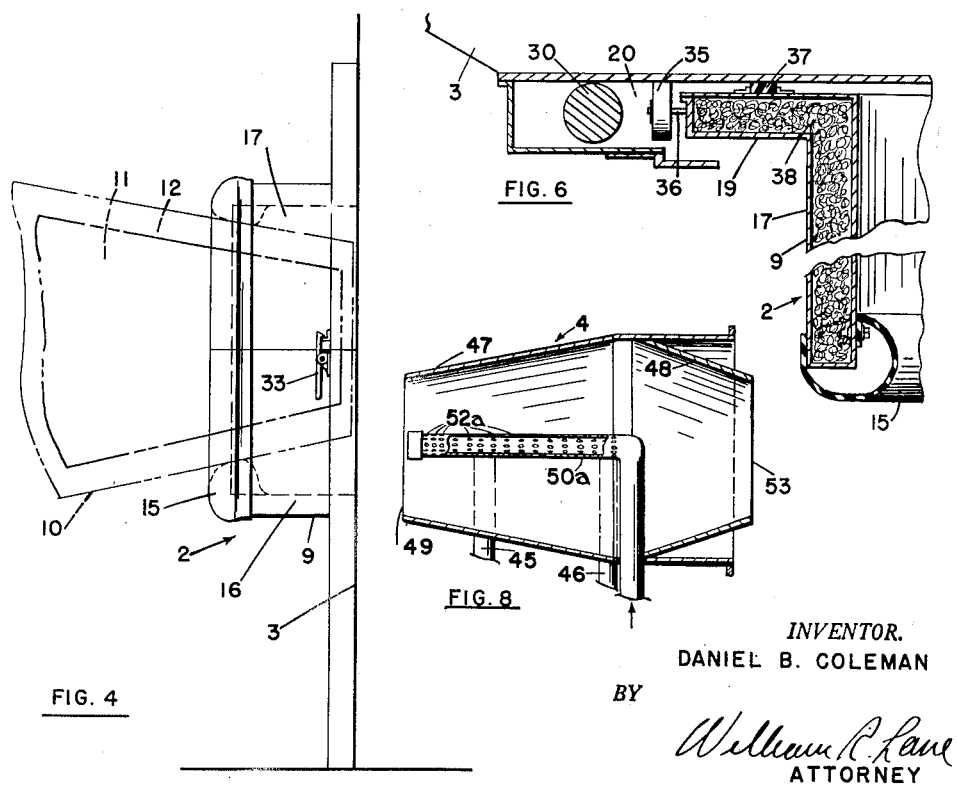
Fig. 4 is an enlarged side elevational view of the end wall and adapter portions of the housing of the device.
Fig. 6 is an enlarged sectional view taken along line 6—6 of Fig. 5.
Fig. 8 is a fragmentary detail view of a modified cooling water discharge arrangement.

Referring now to Figs. 4 and 5 it may be seen that adapter 2 includes a substantially tubular section 9 projecting from end wall 3 to receive aft end 10 of an aircraft fuselage or nacelle which houses exhaust nozzle 11 of the engine. In the usual installation nozzle 11 is spaced from the wall of fuselage 10 so as to leave an annular passage 12 through which cooling air flows in order to protect the fuselage structure from the heat radiated from the engine. When in flight this cooling air will be drawn out with the exhaust, while for ground operation the direction of air flow may be reversed because of a relatively high back pressure and absence of ram. Tubular section 9 of the adapter discharges through aperture 14 in end wall 3 (see Fig. 7) thus directing the exhaust gas from nozzle 11 into the interior of the housing. An annular flexible seal member 15 is included at the outer end of tubular section 9 to provide a sealing connection around the aircraft fuselage or nacelle. This seal should be of a heat resistant material and of sufficient flexibility to permit considerable movement of the aft portion of the aircraft fuselage or nacelle as the engine operates. A movement of twelve inches of the aircraft housing is not unusual in such an installation. The aperture defined by the seal is of course made complementary to the aircraft section to be received so that a tight seal is easily obtained.

Normally it is preferable to construct the adapter section in two segments 16 and 17 movable vertically so as to permit ready reception of the aircraft housing. To this end the arrangement best seen in Figs. 5 and 6 is provided. The two halves of the tubular section 9 of the adapter are integral with two movable door elements 18 and 19 the outer edges of which are received within guide passages 20 which serve to direct the doors in their vertical movement. The doors are counterbalanced for easy movement. Therefore cable 23 fastens to bottom door 18, passes over pulley 24 and is attached to a counterweight 25. A second cable 26 likewise is secured to the bottom door 18, passes over pulleys 27 and 24 and also attaches to counterweight 25. A similar arrangement is provided for upper door 19 whereby cable 28 fastens to this door, extends over pulley 29 to counterweight 30, while second cable 31 also is secured to the upper door and passes over pulleys 32 and 29 to the counterweight. Thus the adapter may be split to permit the aircraft to be backed in place and received within the end wall of the housing. A suitable latch means indicated at 33 may be provided to secure doors 18 and 19 together.

As best seen in Fig. 6 vertical movement of the two doors is facilitated by means of roller wheels 35 which project from the ends of the doors to engage the wall of the guide passage 20. Additionally a seal is provided which closes off both of the doors with respect to the interior of the housing when the sound abatement device is in operation. This comprises sealing element 37 projecting from each of the doors toward end wall 3 so that when the doors are closed a continuous seal is effected around tubular section 9 adjacent opening 14 in the end wall. When an engine is being run there will be a slight negative pressure within the housing with respect to the pressure exteriorly thereof as a result of the aspiration of outside air through intake 7, which will draw doors 18 and 19 tightly against sealing member 37. Lateral door movement for this purpose results from flexibility or clearance provided in the roller mounting shafts 36. As also illustrated in Fig. 6 adapter 2 includes a core 38 of acoustical material to deaden the sound in that area.

Housing 1 is preferably of economical sheet metal construction having dual generally parallel walls 39 and 40. The space within these walls is filled with sand 41, and the latter material gives considerable assistance in abating the sound of the engine as the exhaust discharges into the housing. First, the particles of the loose sand between the walls absorb large amounts of energy thereby reducing much of the noise produced by the engine. The sand provides additional sound attenuation through the phenomenon known as friction damping. The sound energy causes movement of the individual sand grains, and the friction of the particles upon such movement dissipates considerable energy, further reducing the noise level.

As seen in Fig. 7, a chamber 43 is defined by the housing at the portion where the engine discharges therein through aperture 14. Within this chamber aspirator 4 is held on suitable supports 45 and 46. The aspirator includes a divergent section 47 communicating with a convergent choke section 48. Intake aperture 49 of the divergent section is spaced from the nozzle of the engine and substantially in alignment with the discharge jet stream therefrom. The size of opening 49 must be sufficient to assure that all of the exhaust gas from the nozzle will enter the aspirator regardless of movement by the aircraft as the engine is operated. In order to cool the exhaust gases which are received by the aspirator annular water manifolds 50 and 51 are included each provided with a plurality of openings 52 which permit water to be discharged therefrom in a fine stream toward the central axis of the aspirator. As water from the manifolds strikes the exhaust gas stream it is changed almost instantly to steam. It is preferred to locate manifold 50 at entrance 49 to the aspirator while manifold 51 is located where the choke section begins.

Optionally the water injetcion may be accomplished as shown in Fig. 8 where the water manifold 50a is in the form of a straight pipe along the axis of the aspirator. A plurality of holes 52a through the wall of the manifold direct water outwardly in all directions therefrom. This arrangement has the advantage of discharging the cooling water in the hot core of the jet to provide cooling of maximum efficiency.

As the engine is being run and exhaust gases are discharged into chamber 43 the stream of exhaust gases will entrain air from chamber 43 and draw the same with the exhaust gases into aspirator 4 by the familiar jet pump principle. The air for this purpose is drawn in through intake 7. This means that the pressure in chamber 43 will be lower than the ambient pressure.

As the mixed air and gases leave the aspirator at outlet 53 they pass into muffler section 5, several features of the latter being conventional in the art. The muffler includes a central passageway 54 defined by a cylindrical wall 55 perforated with a plurality of holes 56. A second perforated wall 57 is concentric with wall 55 and an acoustical material 58 is interposed between these two walls for absorbing sound energy. The outer wall 59 of the muffler section is also concentric with walls 55 and 57 but has no perforations therethrough. A plurality of baffles 61 define chambers 62 between walls 57 and 59.

These chambers form Humboldt's resonators, familiar in the art of sound attenuation, which, by communicating with the central passageway 54 through relatively small throats formed by perforations 56, resonate with sound in the muffler to dissipate the energy thereof. These chambers are of different volumes so as to resonate to various sound frequencies. In this manner they act as acoustic wave filter side branches having different cut-off frequencies. The attenuation bands overlap so as to avoid loss of attenuation between the bands. One of these chambers 62a may be of particularly large volume with bigger apertures 56a to resonate at frequencies lower than those for the other chambers.

Figure 9:
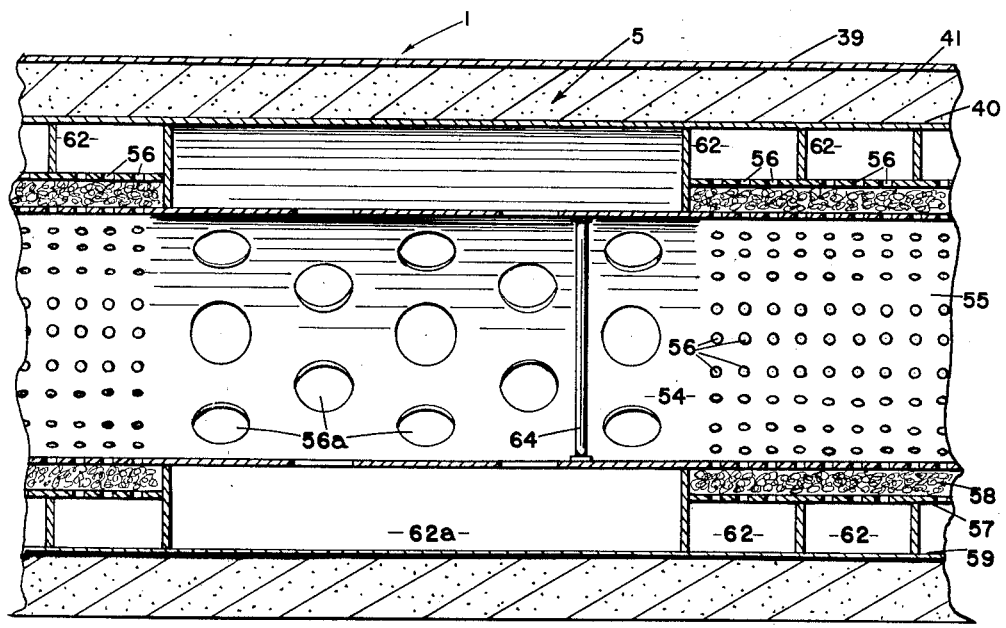
Fig. 9 is a sectional view of the central portion of the sound attenuating device, showing the position of the flow control reactor.
Figure 10:
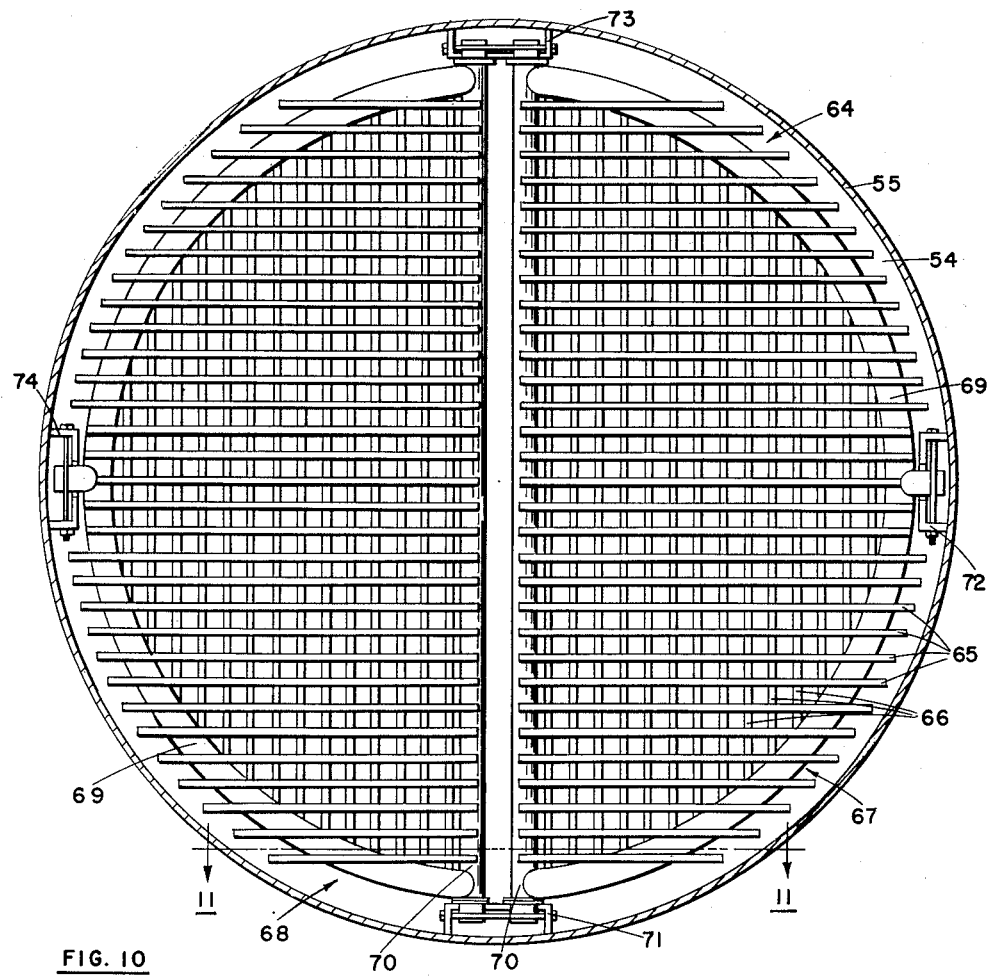
Fig. 10 is a front elevational view of the flow control reactor.
Figure 11:
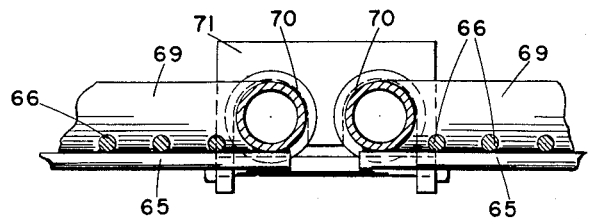
Fig. 11 is a sectional view taken along line 11—11 of Fig. 10 showing the construction of the flow control reactor.

An important feature of this invention is the provision of a flow control reactor 64 within passageway 54 of the muffler chamber. The design of this member may best be seen by reference to Figs. 10 and 11, while Fig. 9 shows the flow control reactor as installed in the muffler section. As may be seen in Fig. 10 the flow control reactor is in the form of a grid of horizontal bars 65 and vertical bars 66 which when welded together are mounted across the diameter of passageway 54 perpendicular to the axis of the muffler section. For convenience of installation the flow control reactor may be made in two sections 67 and 68 each of which includes a semicircular tubular member 69 and a cross member 70. Brackets 71, 72, 73 and 74 are secured to the inner surface of the inner cylindrical member 55 of the muffler section and serve to attach the flow control reactor in place by means of a conventional bolt mounting. Note that the flow control reactor provides a definite obstruction to the flow of exhaust gas and air through the muffler section, but because of the spaces between the bars the flow is not blocked.

After the exhaust gas and air have left the muffler section they pass through elbow 76 and into vertical exhaust stack 6. Preferably the stack is made conically divergent upwardly as shown.

The intake 7 for the air drawn in by the aspirator also includes a muffler which precludes sound from escaping on through this portion of the device. The muffler for the air intake is similar to that used for the aspirated air and exhaust gas, but is smaller in size and is not provided with a flow control reactor. Because of the fact that the design of the air intake muffler is similar to the exhaust muffler no detailed description of the intake muffler will be made, and parts corresponding to those previously described have been given the same number with the suffix "b" added. The intake air passes through elbow 79 which is preferably of double-wall construction with a sand fill such as that used for the remaining portions of the housing.

A balanced design among the various components of the sound abatement device is of critical importance to the success of its operation. In the first place a controlled amount of air must be pumped through the aspirator 4. This is because too much aspiration of outside air through this section will lower the pressure in chamber 43 so as to adversely affect the engine performance. If there is not enough aspiration the engine back pressure in chamber 43 will be too great and again engine performance will not be satisfactory for testing purposes. It is generally preferred to have a back pressure on the engine exhaust that approximates but is slightly lower than ambient. Such a pressure in chamber 43 not only allows accurate engine testing but permits cooling air to flow through passage 12 in the same direction and the same manner as it does when the aircraft is in flight whereby better cooling is obtained. Thus too much or too little aspiration will mean that engine test results are not satisfactory, while the latter will also result in insufficient cooling of the aircraft structure.

A large aspiration of the air into the muffler section presents an additional difficulty in that it requires a unit of considerable size in order to handle the volume of air. Such a unit will be more expensive to construct and will also occupy more of the valuable land area around the engine testing facilities.

Although the size of aperture 49 is more or less fixed by the size of the exhaust nozzle of the engine and the amount of movement thereof, the amount of aspiration can be partially controlled by the spacing of the inlet 49 from the end of the nozzle. Additionally, the design whereby the aspirator has a divergent section 47 assures that the action of the aspirator will not be augmented as would be the case with a convergent opening. Furthermore the choke section 48 converges the flow so as to provide a back pressure thereby decreasing the amount of air which the aspirator pumps. The flow control reactor, by providing an obstruction downstream in passage 54, also has an effect upon the aspirator and influences the amount of air which is pumped thereby.

The flow control reactor has other even more material functions in the operation of the sound abatement device of this invention. The restriction which it imposes upon the flow slows down the velocity of the gases through the muffler. If the flow through the muffler exceeds 400 feet per second a relatively small degree of sound abatement is obtained. High velocity means that laminar flow results in the muffler section which has the effect of insulating the acoustical material and the resonator chambers from the sound, preventing their proper operation. However, the flow is turbulent if the velocity is low, which allows efficient operation of the muffler. With the design illustrated, a velocity of 250 feet per second is obtained without unduly increasing engine back pressure or the size of the device.

Choke 48 also assists in creating turbulence because it throttles the flow to some extent, and the convergent section will disrupt the flow of gases through the aspirator to cause a turbulent condition. The turbulence not only increases the efficiency of sound attenuation, but also enables much more complete cooling by mixing together the hot exhaust gases and the water from the manifolds 50 and 51. Thus the amount of water required for protecting the device from the hot exhaust is greatly diminished by reason of the turbulence which is caused by the various components in the path of the exhaust gases.

The flow control reactor 64 has an additional important effect in reducing the sound level from the engine operation. This apparently results from a directly increased efficiency of the Humboldt's resonators of the muffler section. The flow restriction imposed by the flow control reactor causes an increase in pressure, and thus a greater gas density, upstream thereof. The resonator chambers react with a higher weight of gas and more energy will be absorbed in the resonating process. The flow control reactor effects a closer impedance matching between the resonator chambers and gas in the central passageway 54 so that a greater transfer of energy is obtained. In this way it is possible to eliminate very low frequency sound which conventional muffler design has been unable to cope with.

Another feature of the design of this invention is the configuration of exhaust stack 6 from housing 1. One of the causes of objectionable noise when the exhaust gases are discharged in a normal manner results from the high velocity jet stream shearing through the ambient air. The velocity itself causes noise over and above that produced by the combustion in the engine. By diverging the exhaust stack as shown the gases are diffused and slowed down so that this cause of noise is practically eliminated.

The fact that the housing is made of sheet metal with a sand interlayer between the double walls thereof has several advantages. First the amount of energy absorbed in moving the various sand particles as the energy seeks to escape from the housing provides a large amount of sound abatement. Secondly the structure thereby becomes quite mobile. In order to move the sound abatement device of this invention it is necessary only to cut a hole in the bottom of exterior wall 39 to permit the sand to drain therefrom. After the sand has been removed the light sheet metal structure may be transported where desired. It is then no problem to set the sound abatement device in its new location and refill with the sand between the double walls.

The construction thus described is capable of increasing the efficiency of a conventional muffler by fifty percent. All this is obtainable by a structure of relatively small size which is of economical construction and can be operated at very low expense.

The foregoing detailed description is to be clearly understood as given by way of illustration and example, the spirit and scope of this invention being limited only by the appended claims.

I claim:
1. A sound abatement device comprising a housing, said housing including means for sealingly receiving the exhaust discharge portion of a jet engine; a muffled air inlet to said housing connecting to the interior thereof adjacent said means; an aspirator in said housing positioned to receive the jet exhaust of an engine so received by said means thereby causing said jet to pump air through said inlet; water discharge means in said aspirator for cooling said jet; a muffler in said housing positioned to receive gases passing through said aspirator, said muffler having a central passageway therethrough and resonator chambers around said passageway; and velocity control means in said passageway for restrictively controlling the flow of gases therethrough thereby to control the pumping of said aspirator, retard the flow of gases through said passageway and increase the efficiency of said resonator chambers, said housing having a discharge outlet connected to said passageway for exhausting gases therefrom.

2. A device as recited in claim 1 in which said aspirator comprises a continuous duct section diverging downstream from an inlet thereto greater in diameter than the size of a jet to be received thereby, and a continuous duct section convergent downstream connected to said firstly mentioned duct section for throttling the flow through said aspirator and providing turbulence to the gases passing therethrough.

3. A device as recited in claim 1 in which at least a portion of said housing is defined by a wall having spaced sheet members, and a granular material interposed therebetween whereby said granular material acts as an energy damping medium.

4. A sound abatement device comprising an elongated housing, said housing including means for receiving the exhaust discharge portion of a jet engine and having a chamber therein adjacent said means; a muffled air inlet connecting to said chamber; an aspirator in said chamber positioned to receive the jet exhaust of an engine so received by said means thereby causing said jet to pump air from said inlet through said aspirator; water discharge means in said aspirator for cooling said exhaust; a muffler in said housing, said muffler having a central passageway receiving gases from said aspirator, and resonator chambers around said passageway; and restrictor means in said said passageway, said restrictor means comprising a grid of spaced bars extending diametrically across the entire diameter of said passageway to control the flow of gases therethrough thereby to control the pumping of said aspirator, retard the speed of gases through said passageway and increase the efficiency of said resonator chambers, said housing having a discharge outlet connected to said passageway for exhausting gases therefrom.

5. A sound abatement device comprising a housing an air inlet at one end portion of said housing, said air inlet including muffler means therein; aperture means at said end portion of said housing for sealingly receiving the jet exhaust portions of an aircraft so that the jet therefrom discharges into said housing; an aspirator in said housing laterally spaced from the exhaust portions of an engine received in said aperture means for thereby receiving the jet therefrom, said aspirator including a divergent portion adjacent the inlet thereof and a convergent portion connected to said divergent portion; water discharge means at said aspirator for directing water into gases passing therethrough; muffler means in said housing adjacent said aspirator, said muffler means sealingly engaging said housing at said aspirator and having a passageway aligned with said aspirator for receiving gases therefrom, said muffler means further including resonator chambers disposed around and communicating with said passageway; restrictor means in said passageway for controlling the flow of gases therethrough thereby to cause turbulent flow in said passageway and increase the efficiency of said resonator chambers; and a divergent outlet means connected to said passageway of said muffler for discharging gases therefrom exteriorly of said housing.

6. A sound abatement device comprising a housing at least a portion of the walls of which are provided with a core of loose granular material, said housing having a chamber; inlet means to said chamber for sealingly receiving jet exhaust portions of an aircraft regardless of movement of such portions of such an aircraft during operation of the engine thereof; muffled air inlet means to said chamber; an aspirator in said chamber, said aspirator being aligned with the jet of such portions of said aircraft for receiving said jet whereby said jet pumps air from said air inlet, said aspirator including a divergent inlet portion and a convergent exhaust portion, and being further provided with means for discharging water into a stream of gases passing therethrough; a muffler in said housing adjacent said chamber, said muffler having a central passageway aligned with and receiving gases from said aspirator, said muffler having resonator chambers around said central passageway and in communication therewith; a restrictor means in said passageway downstream of said aspirator, said restrictor means having a plurality of openings therethrough for permitting passage of the gases through said passageway while restricting the velocity thereof thereby to control the pumping through said aspirator and to increase the efficiency of said resonator chambers; and an outlet for said housing, said outlet connecting to said passageway of said muffler means for discharging gases therefrom exteriorly of said housing.

7. A sound attenuating device comprising an elongated housing, one wall of said housing having an opening therein; a substantially tubular adapter surrounding said opening, said adapter being dimensioned to receive jet discharge portions of a jet propelled aircraft, said adapter having annular sealing means at the outer end thereof for sealingly engaging the exterior of jet discharge portions of an aircraft received thereby whereby the jet from operation of the engine of such an aircraft is directed into said housing; a first chamber in said housing for receiving said jet; a muffled air inlet for said first chamber; an aspirator member spaced from said jet discharge portions of said aircraft and dimensioned to receive the jet therefrom, said aspirator including a divergent inlet and a convergent outlet, said aspirator thereby being operative to pump air from said muffled inlet when the jet from said aircraft is received thereby; at least one water discharge member in said aspirator, said discharge member having a plurality of outlets arranged to direct water into a jet received by said aspirator for cooling the same; a muffler adjacent said first chamber, said muffler having a central passage opening to said aspirator for receiving gases therefrom, said muffler including a plurality of resonator chambers communicating with said central passageway; a flow control member in said central passageway for restricting the flow of gases therethrough, said flow control member comprising a grid of bars arranged diametrically across the entire diameter of said passageway at a location spaced from said aspirator; and an exhaust for said housing communicating with said central passageway of said muffler for receiving gases therefrom and conducting the same exteriorly of said housing.

8. A sound attenuating device comprising an elongated housing, at least part of the walls of said housing being of spaced sheet metal members with a sand fill interposed therebetween; a first chamber in said housing; an inlet adapter connecting to said first chamber, said adapter having a resilient sealing means for receiving and engaging the exhaust portions of a jet propelled aircraft for directing the jet therefrom into said chamber; an air inlet into said chamber; muffler means in said air inlet; an aspirator in said chamber, said aspirator being spaced from the exhaust portion of a jet propelled aircraft so received by said adapter and dimensioned to receive the jet from the engine of said aircraft during operation thereof through all power ranges, said aspirator thereby pumping air from said inlet when said jet passes therethrough; water discharge means at said aspirator for directing cooling water into said jet; throttling and turbulence inducing means at said aspirator for providing a turbulent flow and controlling the pumping through said aspirator; a muffler in said housing adjacent to and defining at least part of one wall of said chamber, said muffler being of cylindrical shape having resonator chambers around a central passageway defined by a perforated panel, said panel being connected to said aspirator so as to direct all gases therefrom into said passageway; a restrictor in said passageway, said restrictor comprising a grid of bars extending diametrically across said passageway remote from said aspirator thereby to raise the pressure of gases in said passageway upstream thereof; and an exhaust stack connected to said passageway for receiving gases therefrom and conducting the same exteriorly of said housing.

9. A sound attenuating device comprising a housing; a first inlet means for said housing for receiving the jet exhaust portions of a jet propelled aircraft; a second inlet means for transmitting exterior air into said housing; aspirator means in said housing for receiving the jet exhaust from an aircraft so received and pumping air into said housing through said second inlet; muffler means in said housing for receiving gases from said aspirator, said muffler means including resonator chambers; means in said housing for providing restriction and turbulence to gas flow through said muffler; and outlet means for said housing for transmitting such gases exteriorly thereof.

References Cited in the file of this patent

UNITED STATES PATENTS

| | | |
|---|---|---|
| 674,210 | Loomis | May 14, 1901 |
| 1,027,469 | Forney | May 28, 1912 |
| 1,835,053 | Huby | Dec. 8, 1931 |
| 2,271,892 | Bourne | Feb. 3, 1942 |
| 2,685,936 | Brenneman et al. | Aug. 10, 1954 |